US008965569B2

(12) United States Patent
Siler

(10) Patent No.: US 8,965,569 B2
(45) Date of Patent: Feb. 24, 2015

(54) DISPENSER PROGRAMMING AUTHORIZATION SYSTEM AND METHOD FOR FRAUD PREVENTION

(75) Inventor: Benjamin Tasso Siler, Stokesdale, NC (US)

(73) Assignee: Gilbarco Inc., Greensboro, NC (US)

( * ) Notice: Subject to any disclaimer, the term of this patent is extended or adjusted under 35 U.S.C. 154(b) by 135 days.

(21) Appl. No.: 13/051,161

(22) Filed: Mar. 18, 2011

(65) Prior Publication Data
US 2011/0166948 A1 Jul. 7, 2011

Related U.S. Application Data

(62) Division of application No. 11/614,415, filed on Dec. 21, 2006, now Pat. No. 7,912,577.

(51) Int. Cl.
G06Q 20/00 (2012.01)
G06Q 30/00 (2012.01)
G06Q 50/00 (2012.01)
G07F 13/02 (2006.01)
G06Q 20/20 (2012.01)
G07F 11/00 (2006.01)

(52) U.S. Cl.
CPC .............. G07F 13/025 (2013.01); G06Q 20/20 (2013.01); G06Q 20/206 (2013.01); G06Q 30/0185 (2013.01); G07F 11/002 (2013.01)
USPC ............ 700/237; 700/233; 700/240; 700/241

(58) Field of Classification Search
CPC .................................................. G07F 13/025
USPC .................. 700/232, 233, 237, 231, 240, 241
See application file for complete search history.

(56) References Cited

U.S. PATENT DOCUMENTS

| 4,627,552 A | * | 12/1986 | Yoshida et al. | .................. 222/14 |
| 5,270,943 A | * | 12/1993 | Warn | ............................ 700/241 |
| 5,299,135 A | | 3/1994 | Lieto et al. | |
| 5,369,401 A | | 11/1994 | Haines | |
| 5,394,336 A | * | 2/1995 | Warn et al. | ..................... 700/236 |
| 5,663,887 A | * | 9/1997 | Warn et al. | ..................... 700/232 |
| 5,831,861 A | | 11/1998 | Warn et al. | |

(Continued)

FOREIGN PATENT DOCUMENTS

EP 1182591 A2 2/2002
GB 2338816 A 12/1999

OTHER PUBLICATIONS

International Preliminary Report on Patentability and Written Opinion dated Jul. 2, 2009, corresponding PCT Application No. PCT/US2007/026163, International Filing Date Dec. 21, 2007.

(Continued)

Primary Examiner — Michael K Collins
(74) Attorney, Agent, or Firm — Nelson Mullins Riley & Scarborough, LLP

(57) ABSTRACT

Methods and systems for preventing fraud by a customer at a fuel dispenser within a retail fueling environment are disclosed. According to one method, an authorization to access programming mode (AAPM) signal is received at the fuel dispenser from an authorization terminal coupled to the fuel dispenser. A request is received at the fuel dispenser to enter a programming mode of operation (PMO). The PMO is entered at the fuel dispenser to allow fuel dispenser settings of the fuel dispenser to be changed after receiving the AAPM signal and the request to enter the PMO.

24 Claims, 5 Drawing Sheets

(56) References Cited

U.S. PATENT DOCUMENTS

| | | | | |
|---|---|---|---|---|
| 6,061,668 | A * | 5/2000 | Sharrow | 705/400 |
| 6,078,888 | A * | 6/2000 | Johnson, Jr. | 705/50 |
| 6,360,138 | B1 * | 3/2002 | Coppola et al. | 700/231 |
| 6,360,141 | B1 | 3/2002 | Jensen | |
| 6,374,208 | B1 | 4/2002 | Ferris et al. | |
| 6,525,644 | B1 | 2/2003 | Stillwagon | |
| 6,536,664 | B2 | 3/2003 | Nordqvist et al. | |
| 6,688,342 | B2 * | 2/2004 | Lewis | 141/94 |
| 6,845,907 | B1 | 1/2005 | Enright | |
| 6,850,816 | B2 | 2/2005 | Garratt | |
| 6,857,505 | B1 | 2/2005 | Mason et al. | |
| 6,970,850 | B1 * | 11/2005 | Freeny, Jr. | 705/52 |
| RE39,234 | E | 8/2006 | Ostendorf et al. | |
| 7,565,307 | B1 * | 7/2009 | Pinkus | 705/16 |
| 7,597,252 | B1 * | 10/2009 | Dewitt | 235/381 |
| 7,912,577 | B2 * | 3/2011 | Siler | 700/233 |
| 2003/0028285 | A1 | 2/2003 | Zura et al. | |
| 2003/0195655 | A1 | 10/2003 | Spano, Jr. et al. | |
| 2004/0011621 | A1 | 1/2004 | Olbrich | |
| 2004/0020744 | A1 | 2/2004 | Blum | |
| 2004/0088122 | A1 | 5/2004 | Nanaji et al. | |
| 2004/0249718 | A1 | 12/2004 | Kuroda et al. | |
| 2005/0182681 | A1 | 8/2005 | Bruskotter et al. | |
| 2005/0262027 | A1 | 11/2005 | Hutchinson et al. | |
| 2006/0040603 | A1 | 2/2006 | Nishimura et al. | |
| 2006/0190129 | A1 | 8/2006 | DeLine et al. | |
| 2008/0040287 | A1 | 2/2008 | Harrell et al. | |

OTHER PUBLICATIONS

International Search Report and Written Opinion dated Oct. 24, 2008, corresponding PCT Application No. PCT/US2007/026163, International Filing Date Dec. 21, 2007.

Extended Search Report received from European Patent Office dated May 24, 2011, corresponding EPO Application No. 07863207.2 filed Jul. 14, 2009.

European Examination Report issued May 15, 2014 in corresponding European patent application 07863207.2, all pages.

* cited by examiner

DISPENSER PROGRAMMING AUTHORIZATION SYSTEM AND METHOD FOR FRAUD PREVENTION

CROSS-REFERENCE TO A RELATED APPLICATION

This application is a divisional application of copending application Ser. No. 11/614,415, filed Dec. 21, 2006, which is incorporated fully herein by reference.

FIELD OF THE INVENTION

The present invention relates to a system and method for controlling access to a programming mode for a fuel dispenser (FD) in a fueling environment via an authorization to access programming mode (AAPM) signal.

BACKGROUND OF THE INVENTION

Fuel dispenser fraud is a problem that can result in significant lost revenues annually within retail fueling environments. One method of fraud occurs when persons wishing to perpetrate fraud place a fuel dispenser into a programming mode of operation and program the fuel dispenser to alter metrological functions or other associated parameters related to fuel dispensing. Once altered, the person may dispense fuel either at a reduced cost or by drive-off without any payment since an attendant will not be alerted to the dispensing activity.

In order to access a programming mode of operation for a fuel dispenser and make these changes, the perpetrator need only have keys to access the dispenser electronics cabinet and/or a hand held or other programming device with an associated security code. Once the fuel dispenser is placed into a programming mode, the perpetrator can either change price per volume (e.g., liter or gallon), place the dispenser in an operating mode that does not require point-of-sale (POS) authorization to dispense fuel, calibrate the meters, or change other metrological functions. For example, a perpetrator may arrive at a fuel dispenser and place the dispenser into a programming mode without an attendant being aware of this activity. The perpetrator may then alter the price per gallon/liter for fuel, dispense fuel at a reduced cost, and pay the attendant the reduced amount for the fuel. Alternatively, the perpetrator may place the fuel dispenser into a mode of operation that does not alert the attendant to a request to dispense fuel. In this scenario, the perpetrator may dispense fuel without the attendant even realizing that fuel has been dispensed.

Accordingly, there exists a need to provide fraud protection in a retail fueling environment including preventing a fuel dispenser from being placed into a programming mode of operation prior to it receiving an authorization from authorized personnel to access programming mode (AAPM) signal from a POS device.

SUMMARY OF THE INVENTION

The present invention provides fraud protection within a retail fueling environment by preventing a fuel dispenser (FD) from being placed into a programming mode of operation (PMO) prior to it receiving an authorization to access programming mode (AAPM) signal from authorized personnel via an authorization terminal. In one embodiment, the authorization terminal includes a point-of-sale (POS) device and an attendant or technician issues the AAPM signal from the POS device when programming of the FD is to be performed. Upon receipt of the AAPM signal, the FD starts a timer. If the timer expires or a fueling transaction is initiated prior to the FD being placed into the programming mode, the FD will prevent entry into the programming mode. When the programming mode has been entered, the timer may be restarted. If the programming mode is not exited prior to expiration of the timer or if a transaction is initiated, the programming mode of operation will be exited if the unit is programmed for a minimum access time.

In another embodiment, the authorization terminal includes a remote system and the AAPM signal is generated at a remote location, such as a site controller or a remote system coupled to the retail fueling environment via a network.

In third embodiment, the authorization terminal includes a site controller and the AAPM signal is generated via the site controller.

In a fourth embodiment, the authorization terminal includes a wireless device and the AAPM signal is generated via the wireless device.

In a fifth embodiment, an augmented protocol may be associated with the AAPM signal to further enhance security and to verify that the AAPM signal was actually generated by authorized personnel via one of the POS device, the site controller, or the remote system. The augmented protocol may be developed such that the AAPM signal is either led and/or followed by additional signaling from the generating device that originated the AAPM signal. For example, a certain number (e.g., three) of pump stop signals (not described in detail herein) may be generated after the AAPM signal to further distinguish and identify the AAPM signal generated at one of the POS device, the site controller, or the remote system.

In a sixth embodiment, biometrics associated with the authorized personnel may be maintained, for example within a database, and used for authorizing generation of the AAPM signal. This biometric authorization may also be documented on a per-authorization basis to record which of the authorized personnel changed the programming. Programming changes that were made may also be recorded and associated with the biometric authorization. Further, authorization requests may also be recorded when no changes are made to the programming Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides fraud protection within a retail fueling environment by preventing a fuel dispenser (FD) from being placed into a programming mode of operation prior to it receiving an authorization to access programming mode (AAPM) signal from authorized personnel via an authorization terminal. In one embodiment, the authorization terminal includes a point-of-sale (POS) device and an attendant or technician issues the AAPM signal from the POS device when programming of the FD is to be performed. Upon receipt of the AAPM signal, the FD starts a timer. If the timer expires or a fueling transaction is initiated prior to the FD being placed into the programming mode, the FD will prevent entry into the programming mode. When the programming mode has been entered, the timer is restarted. If the programming mode is not exited prior to expiration of the timer or if a transaction is initiated, the programming mode of operation will be exited.

In another embodiment, the authorization terminal includes a remote system and the AAPM signal is generated at a remote location, such as a site controller or a remote system coupled to the retail fueling environment via a network.

In a third embodiment, the authorization terminal includes a site controller and the AAPM signal is generated via the site controller.

In a fourth embodiment, the authorization terminal includes a wireless device and the AAPM signal is generated via the wireless device.

In a fifth embodiment, an augmented protocol may be associated with the AAPM signal to further enhance security and to verify that the AAPM signal was actually generated by authorized personnel via one of the POS device, the site controller, or the remote system. The augmented protocol may be developed such that the AAPM signal is either led and/or followed by additional signaling from the generating device that originated the AAPM signal. For example, a certain number (e.g., three) of pump stop signals (not described in detail herein) may be generated after the AAPM signal to further distinguish and identify the AAPM signal generated at one of the POS device, the site controller, or the remote system.

Figure 1:
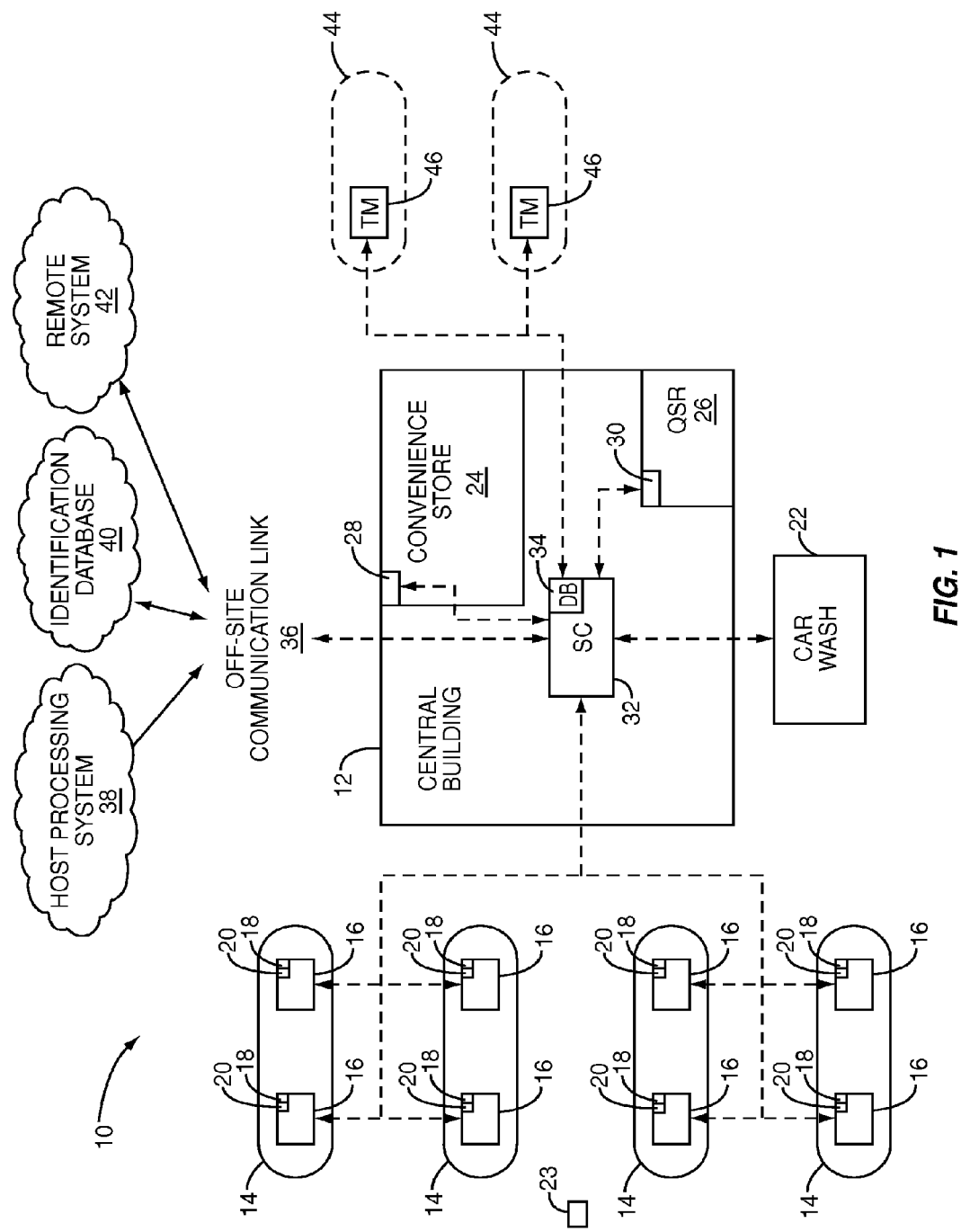
FIG. 1 is a schematic diagram of an exemplary retail service station environment in accordance with disclosed embodiments of the present invention to increase fraud protection within the retail fueling environment by preventing fuel dispensers from being placed into a programming mode of operation prior to receiving an authorization to access programming mode (AAPM) signal.

FIG. 1 is a schematic diagram of an exemplary retail fueling environment 10 in accordance with disclosed embodiments of the present invention to increase fraud protection within the retail fueling environment 10 by preventing fuel dispensers from being placed into a programming mode of operation prior to receiving an authorization to access programming mode (AAPM) signal. The retail fueling environment 10 includes a central building 12, a plurality of fueling islands 14, each including multiple fuel dispensers (FDs) 16 having control systems 18 and manager's keypads 20, and a car wash 22. The manager's keypads 20 are used to place the FDs 16 into a programming mode of operation. As will be described in more detail below, the FDs 16 will prevent entry into a programming mode of operation prior to receipt of an AAPM signal and authorization to enter the programming mode of operation exists thereafter for the duration of a timer or until a transaction is started at the FD.

A wireless device 23 is illustrated within the retail fueling environment 10. The wireless device 23 may be used by an attendant, technician, or other authorized personnel as an authorization terminal to generate the AAPM signal and any related signaling from a location proximate to the FDs 16 to allow any of the FDs 16 to be placed into the programming mode of operation without the authorized person having to repeatedly travel between the central building 12 and the FDs 16 or to repeatedly request that a remote system generate the signaling, as will be described in more detail below.

The central building 12 need not be centrally located within the retail fueling environment 10, but rather is the focus of the retail fueling environment 10, and may house a convenience store 24 and/or a quick serve restaurant (QSR) 26 therein. Both the convenience store 24 and the QSR 26 may include point-of-sale (POS) devices 28 and 30, respectively. In addition to POS transaction processing, the POS devices 28 and 30 are used to generate the AAPM signal upon appropriate authorization and to send that signal to the FDs 16 to allow the FDs 16 to be placed into a programming mode of operation.

The central building 12 further includes a site controller (SC) 32, which in an exemplary embodiment may be the G-SITE® sold by Gilbarco Inc. of Greensboro, N.C. or other third party site controller. The SC 32 may control the authorization of fueling transactions and other conventional activities, as is well understood. The SC 32 may be incorporated into a POS device, such as the POS devices 28 and 30, if needed or desired, such that the SC 32 also acts as a POS device.

The SC 32 includes a database (DB) 34 capable of storing identification and authorization indicia. This identification and authorization indicia may be used to identify an individual making a programming request at any POS device, such as the POS devices 28 and 30, within the retail fueling environment 10. This identification of the individual may include use of biometric information or other data. The identification and authorization indicia may also be used to authenticate the programming request from that individual by use of passwords or other information, such as an employee identification number or fingerprint, that may be entered at the POS terminal during a programming request sequence. The identification and authentication indicia, such as the fingerprint or employee identification number, may also be documented on a per-authorization basis to record which of the authorized personnel changed the programming. Programming changes that were made may also be recorded and associated with the programming request. Further, authorization requests may also be recorded when no changes are made to the programming Further, the SC 32 may have an off-site communication link 36 allowing communication with a remote location for credit/debit card authorization via a host processing system 38, an identification database 40, and/or a remote system 42. The identification database 40 can be used to remotely store the information described above in association with the DB 34. The remote system 42 represents another computer, system, or device that can be used to access identification information, such as credit card and/or fingerprint data. The off-site communication link 36 may be routed through the Public Switched Telephone Network (PSTN), the Internet, both, or the like, as needed or desired.

It should be noted that the car wash 22, the convenience store 24, and the QSR 26 are all optional and need not be present in a given retail fueling environment.

As described above, the plurality of fueling islands 14 may have one or more FDs 16 positioned thereon. The FDs 16 and the POS terminals 28 and 30 are in electronic communication with one another and with the SC 32 through a Local Area Network (LAN), pump communication loop, or other communication channel or line, or the like.

The retail fueling environment 10 also has one or more underground storage tanks (USTs) 44 adapted to hold fuel therein. As such, the USTs 44 may be double-walled USTs. Further, each UST 44 may include a liquid level sensor or other sensor (not shown) positioned therein. The sensors may report to a tank monitor (TM) 46 associated therewith. The TM 46 may communicate with the FDs 16 (either through the SC 32 or directly, as needed or desired) to determine amounts of fuel dispensed, and compare fuel dispensed to current levels of fuel within the USTs 44 to determine if the USTs 44 are leaking. In a typical installation, the TM 46 is also positioned in the central building 12, and may be proximate to the SC 32. The TM 46 may communicate with the SC 32 for leak detection reporting, inventory reporting, or the like.

Figure 2:
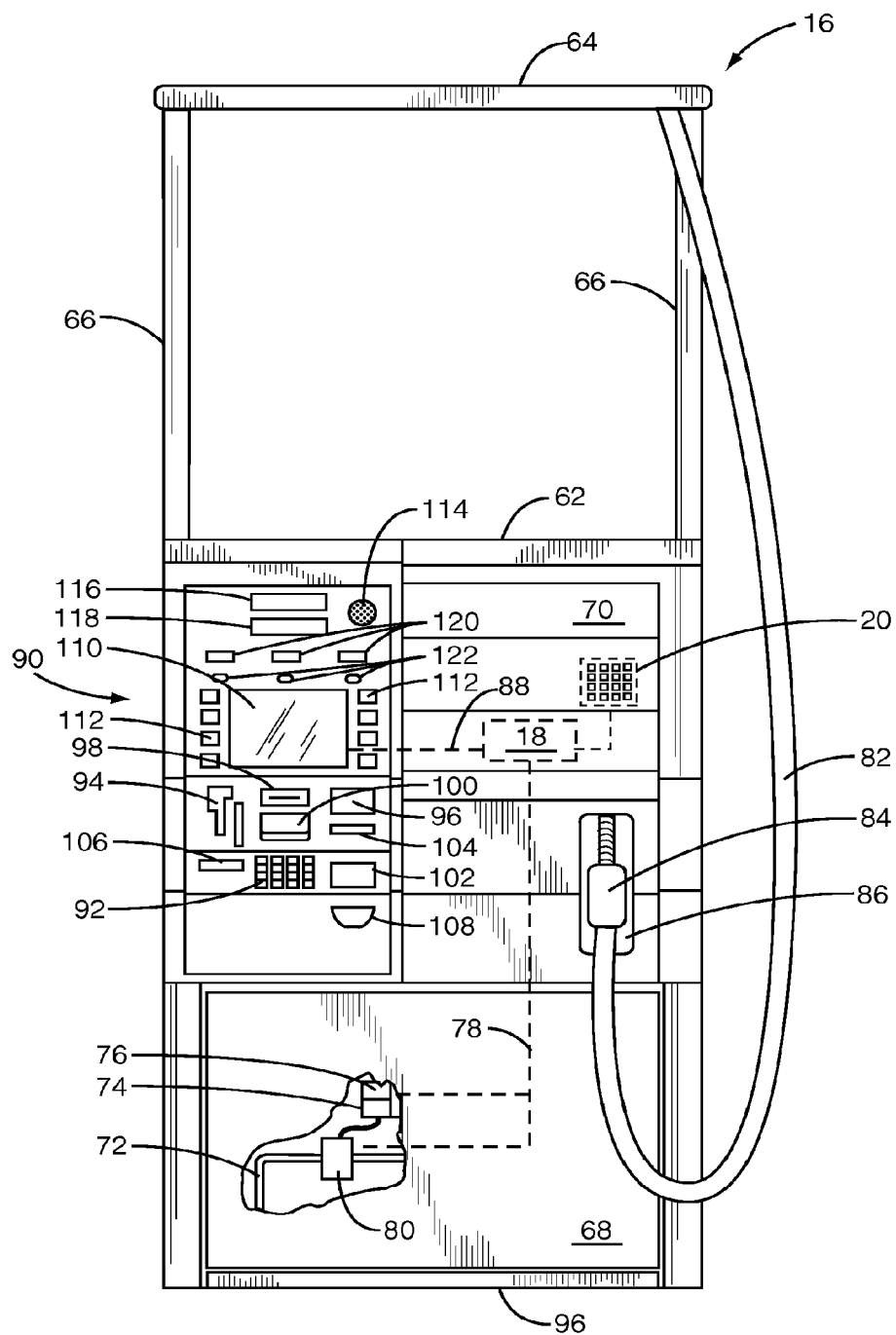
FIG. 2 illustrates a detailed view of an exemplary fuel dispenser (FD) that operates in conjunction with a point-of-sale (POS) device and/or a site controller (SC) within the retail fueling environment to provide fraud protection by limiting access to a programming mode of operation for the FD prior to receipt of the AAPM signal.

FIG. 2 illustrates a detailed view of an exemplary FD 16 that operates in conjunction with any of the POS devices 28 and 30, and/or the SC 32, within the retail fueling environment 10 to provide fraud protection by limiting access to a programming mode of operation for the FD 16 prior to receipt of the AAPM signal. The FD 16 includes the control system 18 and manager's keypad 20 described above. The manager's keypad 20 is used to place the control system 18 of the FD 16 into a programming mode of operation. The control system 18 will prevent entry into a programming mode of operation prior to receipt of an AAPM signal.

The FD 16 has a base 60 and a top 62, with a canopy 64 supported by two side panels 66. The FD 16 is subdivided into multiple compartments. A hydraulic area 68 is used to enclose hydraulic components and an electronic area 70 is used to enclose electronic components. A vapor barrier (not shown) may be used to separate the hydraulic area 68 from the electronic area 70.

Several components used to control fuel flow may be housed within the hydraulic area 68. Fuel from USTs 44 (FIG. 1) is pumped through a piping network into inlet or fuel dispensing pipes. An inlet pipe 72 provides a piping network from an UST.

When fuel is dispensed, fuel begins to travel through a meter 74, which is responsive to flow rate or volume. A pulser 76 is employed to generate a signal in response to fuel movement through the meter 74. Control/data lines 78 provide a signaling path from the pulser 76 to the control system 18. The control/data lines 78 provide signals to the control system 18 indicative of the flow rate or volume of fuel being dispensed within the meter 74. The control/data lines 78 may provide control signaling to a valve 80 that may be opened and closed to dispense and terminate dispensing of fuel, respectively.

The control system 18 includes a controller and control circuitry (not shown) for controlling access to a programming mode of operation, as will be described in more detail below. The control system 18 also controls transaction-level and functional processing within the FD 16 by collecting meter flow measurements from the pulser 76, performing calibration operations associated with the meter 74, and performing calculations such as cost associated with a fuel dispensing transaction. Additionally, the control system 18 controls transactional processing at the FD 16, as will be described in more detail below.

As fuel is dispensed from the FD 16, the control system 18 receives signaling from the pulser 76 associated with the meter 74 described above during the dispensing transaction. In response to receipt of signaling from the pulser 76, the control system 18 provides transaction-level functionality within the FD 16. The control system 18 collects, either directly or indirectly, meter flow measurements associated with the meter 74.

As a dispensing transaction progresses, fuel is then delivered to a hose 82 and through a nozzle 84 into the customer's vehicle (not shown). The FD 16 includes a nozzle boot 86, which may be used to hold and retain the nozzle 84 when not in use. The nozzle boot 86 may include a mechanical or electronic switch (not shown) to indicate when the nozzle 84 has been removed for a fuel dispensing request and when the nozzle 84 has been replaced, signifying the end of a fueling transaction. A control line (not shown) provides a signaling path from the electronic switch to the control system 18. The control system 18 uses signaling received via the control line in order to make a determination as to when a transaction has been initiated or completed.

The control system 18 uses control/data lines 88 to interface to a user interface 90 that includes various combinations of subsystems to facilitate customer interaction with the FD 16. The user interface 90 may include a keypad 92. The keypad 92 may be used for selection of different types of purchase transactions available to the customer or to enter an authentication code. The keypad 92 may also be used for entry of a personal identification number (PIN) if the customer is using a debit card for payment of fuel or other goods or services.

The user interface 90 may also contain a magnetic strip card reader 94 for insertion of credit, debit or other magnetic strip cards for payment. Additionally, the magnetic strip card reader 94 may accept loyalty or program-specific cards that entitle the customer to a fixed credit or percentage discount or other favorable pricing on fuel or other goods/services.

The user interface 90 may also include a radio-frequency (RF) antenna 96. The RF antenna 96 is coupled to an RF interrogator (not shown). If the customer is tendering a radio frequency identifier (RFID) for payment of a car wash, the RF antenna 96, as controlled by the RF interrogator, will generate a field to interrogate the customer's RFID. The RFID and the RF antenna 96 will communicate using RF communications to identify the customer's account or other payment information. For more information on RFID payments and interaction at a FD, see U.S. Pat. No. 6,073,840, entitled "Fuel Dispensing and Retail System Providing for Transponder Prepayment," issued Jun. 13, 2000, which is incorporated herein by reference in its entirety.

The user interface 90 may also include other payment or transactional devices to receive payment information for transaction processing associated with transactions, including a bill acceptor 98, an optical reader 100, a smart card reader 102, and a biometric reader 104. The user interface 90 also includes a receipt printer 106 so that a receipt with a recording of the transaction carried out at the FD 16 may be generated and presented to the customer. A change delivery device 108 may also be used to deliver change for overpayment to a customer. A display 110 is used to provide information, such as transaction-related prompts and advertising, to the customer. Soft keys 112 are used by the customer to respond to information requests presented to the user via the display 110. An intercom 114 is provided to generate audible cues for the customer and to allow the customer to interact with an operator or attendant.

In addition, the FD 16 includes a transaction price total display 116 that may be used to present the customer with the price to be charged to the customer for fuel that is dispensed. A transaction gallon total display 118 may be used to present the customer with the measurement of fuel dispensed in units of gallons or liters as a volume of fuel dispensed from the FD 16. Octane selection buttons 120 are provided for the customer to select which grade of fuel is to be dispensed before dispensing is initiated. Price per unit (PPU) displays 122 are provided to show the price per unit of fuel dispensed in either gallons or liters, depending upon the programming of the FD 16. As will be described in more detail below, a perpetrator attempting to commit fraud may attempt to reprogram the FD 16 to associate a lower or zero PPU than what is the actual cost of fuel.

Figure 3:
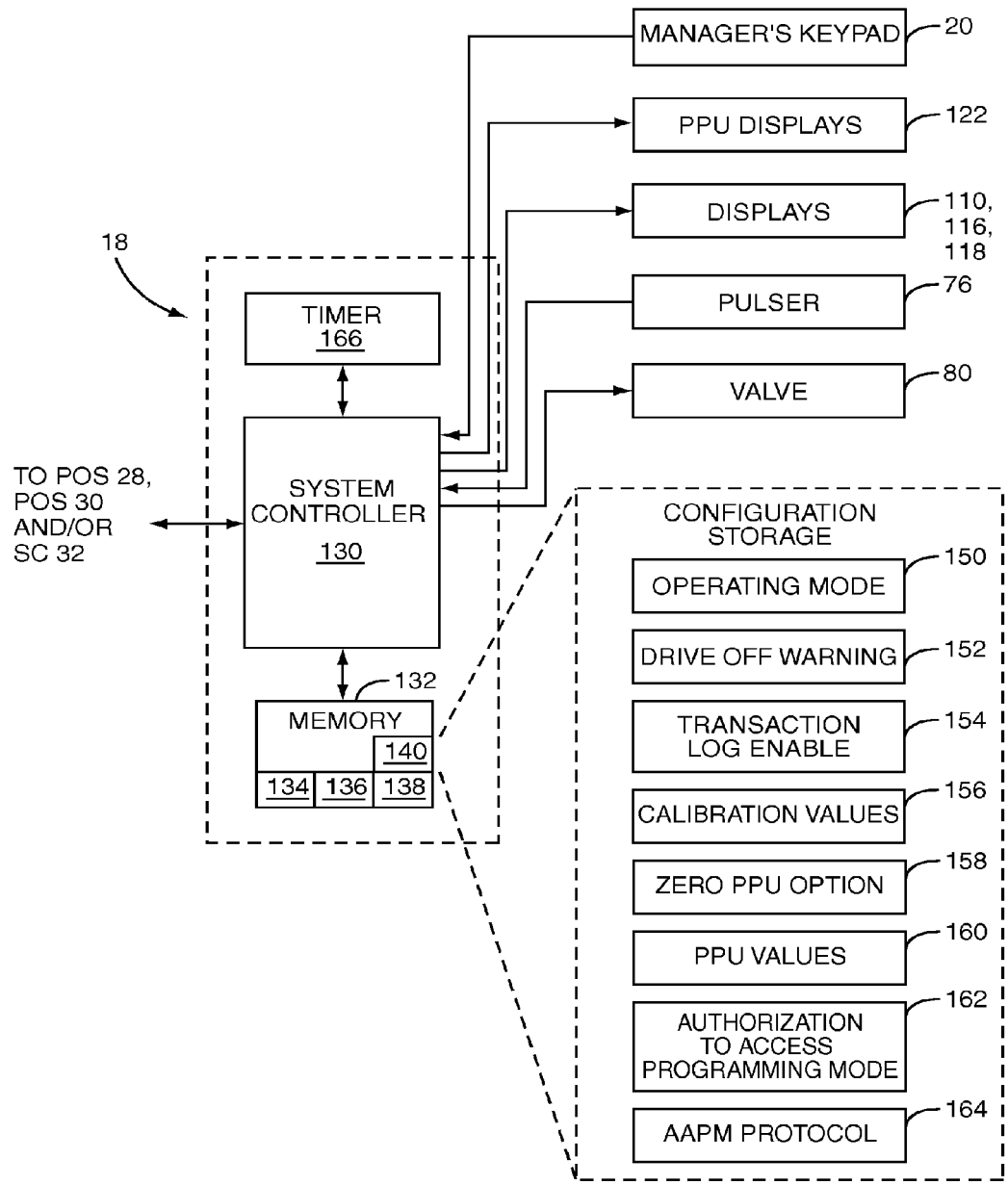
FIG. 3 illustrates a block diagram of an exemplary control system associated with a FD for controlling entry into a programming mode of operation in response to receipt of the AAPM signal.

FIG. 3 illustrates a block diagram of exemplary control system 18 that may be used to control access to a programming mode for the FD 16 for controlling entry into a programming mode of operation in response to receipt of the AAPM signal either from a POS device, such the POS devices 28 or 30, or from the SC 32. It should be noted that other control elements that are associated with the FDs 16, such as certain components of the user interface 90 (FIG. 2), are not illustrated within FIG. 3 to allow the present description to focus on the components that control access to the programming mode for the FDs 16. The control system 18 allows the FD 16 to communicate with the POS devices 28 and 30, other FDs 16, and/or the SC 32 to complete transactions within the retail fueling environment 10.

The elements of the FD 16 that are depicted within FIG. 3 (e.g., manager's keypads 20, PPU displays 122, etc.) are illustrated vertically along the top right side of FIG. 3. A system controller 130 is illustrated interconnected to these elements for interpreting or controlling functionality associated with these elements within the FD 16. The system controller 130 operates to control access to the programming mode of operation for the FD 16.

A memory 132 is connected to the system controller 130. The memory 132 may be used to store user transaction information that is associated with transactions within the retail fueling environment 10, such as identification card data and/or fingerprint identification data associated with an active transaction. The memory 132 may also include a read only memory (ROM) 134, a random access memory (RAM) 136, and a non-volatile memory 138.

Additionally, a configuration storage area 140 is illustrated within the memory 132. The configuration storage area 140 is further illustrated as a magnified area on the lower right side of FIG. 3. As can be seen from FIG. 3, configuration information that is associated with the FD 16 is illustrated within the configuration storage area 140.

Exemplary fields that are illustrated within the configuration storage area 140 of FIG. 3 include an operating mode field 150, a drive off warning field 152, a transaction log enable field 154, a calibration values field 156, a zero price per unit (PPU) field 158, a PPU values field 160, an authorization to access programming mode (AAPM) field 162, and an AAPM protocol field 164. Additional configuration fields are possible. For ease of illustration, these additional fields are not included within FIG. 3. As will be described in more detail below, an AAPM protocol may be associated with generation of the AAPM signal to further enhance security.

As will be described in more detail below, upon receipt of an AAPM signal at the FD 16 from one of the POS devices 28 and 30, the SC 32, or the remote system 42, the AAPM field 162 is set to authorize access to the programming mode of operation for the FD 16. Additionally, a timer 166 is started to allow a duration of time to be measured from receipt of the AAPM signal until a request is issued to enter the programming mode at the FD 16. This request to enter the programming mode of operation may be initiated, for example, via the manager's keypad 20 by any appropriate sequence of keystrokes.

The timer 166 may be an up-counting or down-counting timer, and may further be interrupt driven such that an interrupt is generated to the system controller 130 upon expiration of the timer 166. Alternatively, the timer 166 may be polled without departure from the scope of the subject matter described herein. If a request to enter the programming mode of operation is not received prior to expiration of the timer 166, as will be described in more detail below in association with FIG. 5, the AAPM field 162 may be cleared and the FD 16 will thereafter be prevented from entering the programming mode of operation until a new AAPM signal is received. An exemplary timeout value for the timer 166 may be five (5) minutes. A value similar this should be sufficient enough for the attendant or technician to issue the AAPM signal from a POS device, such as one of the POS devices 28 and 30, and walk to the FD 16 prior to expiration of the timer 166. Other timeout values may be selected with respect to physical separation of the POS devices 28 and/or 30 from the FD 16 and other criteria, such as physical condition of the attendant or technician.

Additionally, if a transaction is started by a customer at the FD 16 during the window of time delineated by the timer period associated with the authorization to enter the programming mode of operation, the FD 16 will thereafter also be prevented from entering the programming mode of operation until a new AAPM signal is received. This will prevent the FD 16 from maintaining a state of authorization to enter the programming mode of operation, as will be described in more detail in association with FIG. 5 below, while a customer is using the FD 16. After the transaction is completed, the attendant or technician can re-issue the AAPM signal to start the timer and to re-enter the authorization mode.

As described above, an augmented protocol may be associated with the AAPM signal to further enhance security and to verify that the AAPM signal was actually generated by authorized personnel via one of the POS devices 28 and 30, the SC 32, or the remote system 42. The augmented protocol may be developed such that the AAPM signal is either led and/or followed by additional signaling from the generating device that originated the AAPM signal. For example, a certain number (e.g., three) of pump stop signals (not described in detail herein) may be generated after the AAPM signal to further distinguish and identify the AAPM signal generated at one of the POS devices 28 and 30, the SC 32, or the remote system 42. In this way, verification of the AAPM signal may also be performed upon receipt of the AAPM signal and associated signaling, referred to as AAPM signaling, by the system controller 130 by verifying that the additional signaling associated with the augmented protocol is present. This augmented protocol may be altered from time to time to further increase security. Furthermore, the augmented protocol may be stored within the AAPM protocol field 164 and may be entered via the manager's keypad or downloaded to the FD 16 from one of the POS devices 28 and 30, the SC 32, or the remote system 42.

The configuration storage area 140 may include any form of storage medium, either alone or in combination, that is capable of storing configuration data for the FD 16, and may further be included within ROM 134, RAM 136, and the non-volatile memory 138. For example, the configuration storage area 140 may include a variety of registers, RAM, non-volatile memory, or any combination of these types of storage. The configuration storage area 140 may also include disk storage and may further be remote from the FD 16 and accessible, for example, via the SC 32. Furthermore, the configuration storage area 140 may be included within the system controller 130 without departure from the scope of the subject matter described herein.

Regarding the fields within the configuration storage area 140, the operating mode field 150 may be used to place the FD 16 into the programming mode of operation. The operating mode field 150 may also be used to place the FD 16 into a stand-alone mode of operation that would not need any authorization to dispense fuel. A perpetrator that is attempting to commit fraud would likely attempt to change the operating mode field 150 via the manager's keypad or a hand-held programming device to place the FD 16 into the programming mode of operation and then to place the FD 16 into the stand-alone mode of operation. If successful, the perpetrator would be able to dispense fuel by causing the fuel dispenser to open the valve 80. In this scenario, the PPU displays 122 would remain unchanged. The pulser 76 would generate pulses based upon fuel flow and the display 110, the transaction price total display 116, and the transaction gallon total display 118 would update as initially programmed by the attendant or technician.

However, when coupled with the AAPM signaling as described herein generated by one of the POS devices 28 and 30 or the SC 32, the perpetrator would be unable to cause the FD 16 to enter the programming mode of operation by conventional means. Accordingly, fraud may be prevented at the FD 16 by use of the AAPM signaling.

Other exemplary problems with conventional fuel dispensers that are solved by use of the description herein include preventing changes to other fields within the configuration storage area 140. For a convention fuel dispenser, once placed into the programming mode of operation, the perpetrator may further conceal fraud by performing other configuration changes to the conventional fuel dispenser. For example, the perpetrator could turn the drive off warning field 152 to an "off" state, thereby disabling any drive off warning indication that the attendant may otherwise receive. Additionally, the transaction log enable field 154 that stores records of transactions at the conventional fuel dispenser could be altered or disabled when in the programming mode of operation. Calibration values field 156 and or PPU values field 160 could be altered which would result in different values being displayed on PPU displays 122, the display 110, the transaction price total display 116, and the transaction gallon total display 118.

As another example, the zero PPU field 158 may be set to cause the price per unit of fuel to be zero. All of these types of fraud may be prevented within the FD 16 by use of the AAPM signaling described herein.

Figure 4:
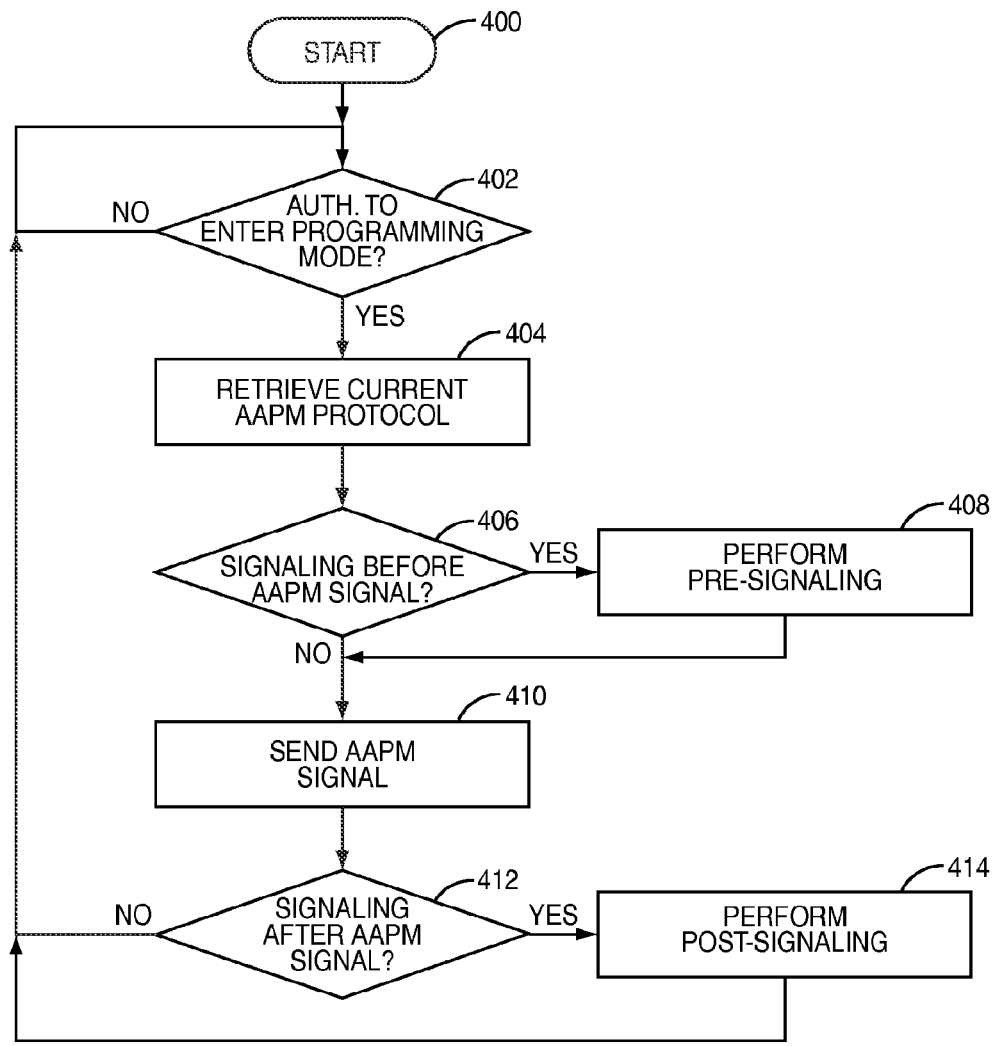
FIG. 4 illustrates an exemplary process that may be executed on a POS device, an SC with a POS interface, a remote system, or a wireless device to facilitate protection from fraud within a retail fueling environment by providing the AAPM signal to a FD in response to an input selection by the attendant or technician requesting that the AAPM signal be generated.

FIG. 4 illustrates an exemplary process that may be executed on a POS device, such as the POS devices 28 and 30, the SC 32 with a POS interface, the remote system 42, or the wireless device 23 to facilitate protection from fraud within the retail fueling environment 10 by providing the AAPM signal to the FD 16 in response to an input selection by the attendant or technician requesting that the AAPM signal be generated. Initially, the process starts (step 400). The process then waits for a request to generate and send the AAPM signal to a FD 16 (decision point 402). This request may include an identifier that is associated with the FD 16 to allow the AAPM signal to be directed toward a specific FD 16. Alternatively, the request may include a request to broadcast the AAPM signal to multiple FDs 16 within the retail fueling environment 10. In either case, the AAPM signal may be directed to the appropriate FDs 16, as described in more detail below.

Upon receipt of a request to send the AAPM signal to a FD 16, the process retrieves the current AAPM protocol from storage (step 404). As described above with respect to FIG. 3, multiple signaling options may be associated with the AAPM signal generation such that additional signaling may be generated prior to or after the AAPM signal. Based upon the current AAPM protocol, the signaling may be varied to further increase fraud protection within the retail fueling environment 10.

The process determines, based upon the current protocol that has been retrieved, whether signaling is to be generated prior to the AAPM signal (decision point 406). When signaling is to be generated prior to the AAPM signal, the process performs the appropriate pre-signaling (step 408). As described above, this may include sending additional signals, such as fuel dispenser "stop" signals, to the FD 16. Other signaling options are possible. Additionally, any number of additional signals, such as three (3) stop signals, may be sent to the FD 16. The FD 16 may monitor the incoming signaling and activate a process to receive the AAPM signal, as described in more detail below in association with FIG. 5, upon detecting the pre-signaling sequence that is associated with the current AAPM protocol.

When pre-signaling is not to be generated prior to the AAPM signal or after the appropriate signaling is generated, the process sends the AAPM signal to the FD 16 (step 410). The process then determines, based upon the current protocol that has been retrieved, whether signaling is to be generated after the AAPM signal (decision point 412). When signaling is to be generated after the AAPM signal, the process performs the appropriate post-signaling (step 414). As described above, this may include sending additional signals, such as fuel dispenser "stop" signals, to the FD 16. Other signaling options are possible. Additionally, any number of additional signals, such as three (3) stop signals, may be sent to the FD 16. The FD 16 may monitor the incoming signaling and ensure that proper post-signaling is received, as described in more detail below in association with FIG. 5, prior to allowing entry into the programming mode of operation. When post-signaling is not to be generated after the AAPM signal or after the appropriate signaling is generated, the process returns to await a new request to send the AAPM signal (decision point 402).

Figure 5:
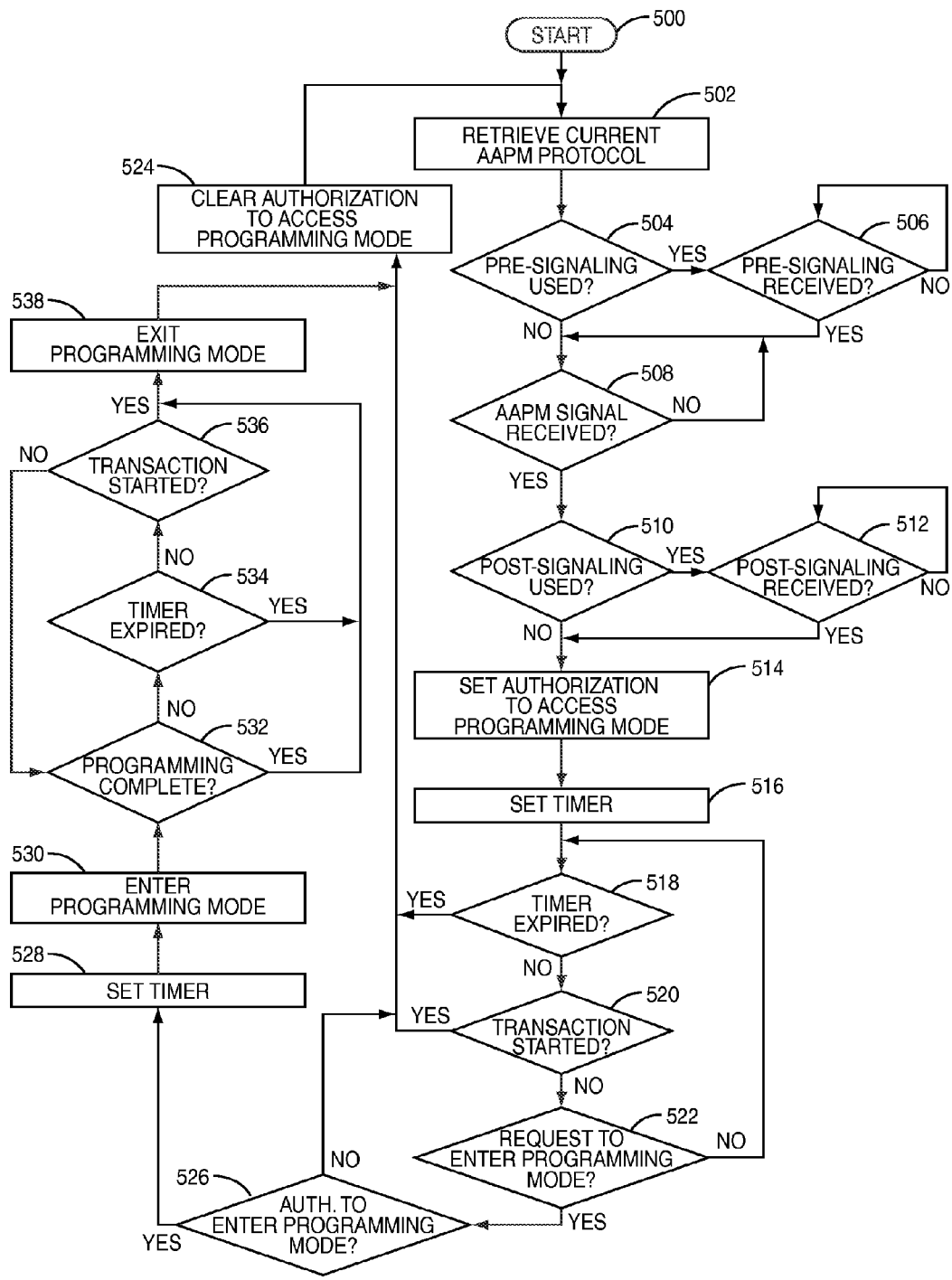
FIG. 5 illustrates an exemplary process that may be executed on a FD and that responds to the AAPM signaling generated by the process of FIG. 4 to facilitate protection from fraud within a retail fueling environment by preventing the FD from being placed into the programming mode of operation at times other than during a window of time after receipt of the AAPM signal.

FIG. 5 illustrates an exemplary process that may be executed on the FD 16 and that responds to the AAPM signaling generated by the process of FIG. 4 to facilitate protection from fraud within the retail fueling environment 10 by preventing the FD 16 from being placed into the programming mode of operation at times other than during a window of time after receipt of the AAPM signal. Initially, the process starts (step 500). The process retrieves the current AAPM protocol from either a remote source, such as the SC 32 or one of the POS terminals 28 and 30, or from memory, such as the AAPM protocol field 164 of the memory 132 (step 502). If retrieved from a remote source, the process may also store the received protocol (not illustrated) within the AAPM protocol field 164.

As described above in association with FIG. 4, pre-signaling may occur during generation and transmission of the AAPM signal depending upon the current AAPM protocol. Accordingly, the process determines whether pre-signaling is used in the current AAPM protocol (decision point 504). When pre-signaling is used in the current AAPM protocol, the process will wait for appropriate pre-signaling to be received (decision point 506). When either appropriate pre-signaling is received or when pre-signaling is not used for the current AAPM protocol, the process will wait for the AAPM signal to be received (decision point 508). It should be noted that appropriate error handling procedures may be employed to manage any timeout or other error conditions associated with any of the stages of the processes described herein.

When the AAPM signal is received, the process will determine whether post-signaling is used with the current AAPM protocol (decision point 510). When post-signaling is used in the current AAPM protocol, the process will wait for appropriate post-signaling to be received (decision point 512). When either appropriate post-signaling is received or when post-signaling is not used for the current AAPM protocol, the process will enable access into the programming mode of operation by setting the AAPM field 162 (step 514). The process will also set a timer, such as the timer 166, to measure an amount of time after receipt of the AAPM signal (step 516). It should be noted that the AAPM field 162 and the timer 166 may be set at another point during the process, such as after receipt of the AAPM signal (decision point 508), without departure from the scope of the subject matter described herein.

As described above, this timer may be an up-counting timer, a down-counting timer, interrupt driven or polled without departure from the scope of the subject matter described herein. The timer effectively creates a window of opportunity for the attendant or technician to place the FD 16 into a programming mode of operation. After expiration of the timer or upon initiation of a transaction by a customer, as will be described in more detail below, the FD 16 will no longer be authorized to be placed into a programming mode of operation without a new AAPM signal being received.

The present description assumes that the attendant or technician has observed that there is not an ongoing transaction at the FD 16 prior to issuing the AAPM signaling. However, if an active transaction is in process at the FD 16 when the AAPM signal is issued, appropriate error signaling may be generated and issued to the AAPM signaling source to alert the attendant or technician that a transaction is currently in process at the FD 16.

After setting the AAPM field 162 (step 514) and the timer 166 (step 516), the process then determines whether the timer has expired (decision point 518). When the process has determined that the timer has not expired, the process determines whether a transaction has been initiated at the FD 16 (decision point 520). When a transaction has not been initiated at the FD 16, the process determines whether a request to enter the programming mode of operation has been initiated by the attendant or technician (decision point 522). As described above, the manager's keypad 20 may be used to initiate a request to enter the programming mode of operation by any suitable key combination. The code used to enter the programming mode of operation may also be altered when the FD 16 is in the programming mode of operation by any suitable means, such as entry of programming information via the manager's keypad 20.

When a request to enter the programming mode of operation has not been initiated (decision point 522), the process iterates to determine whether the timer has expired (decision point 518), whether a transaction has been initiated (decision point 520), and whether a request to enter the programming mode of operation has been received (decision point 522). When a determination is made that the timer has expired (decision point 518), the process will clear the AAPM field 162 (step 524) and return to retrieve the current protocol (step 502) and continue as described above. Likewise, when a determination is made that a transaction has been initiated (decision point 520), the process will also clear the AAPM field 162 (step 524) and return to retrieve the current protocol (step 502) and continue as described above.

When a request to enter the programming mode of operation has been received (decision point 522) and the timer 166 has not expired and a transaction has not been initiated at the FD 16, the process will determine whether authorization to enter the programming mode has been received (decision point 526). Should there be a system malfunction or other problem with the FD 16, such as a memory problem, the AAPM field 162 may not be set. Accordingly, if it is determined that the authorized to enter programming mode field 162 is not set or is corrupted, the process will perform an action to clear the AAPM field 162 (step 524) and return to retrieve the current protocol (step 502) and continue as described above. When a determination is made that the AAPM field 162 is set and that programming has been authorized and is still allowed (decision point 526), the process will reset the timer 166 (step 528). The timer 166 may be used and set in this situation to an amount of time sufficient to allow most programming operations to be completed at the FD 16. Accordingly, the timer 166 may be used, as will be described in more detail below, to remove the FD 16 from the programming mode of operation should the attendant or technician fail to remove the FD 16 from the programming mode of operation during the programming sequence. The process will then enter the programming mode of operation (step 530).

It should be noted that use of the AAPM field 162 may be optional for purposes of the functionality with respect to controlling access to the programming mode of operation for the FD 16. The timer 166 may be used as described above to manage entry into and exit from the programming mode of operation for the FD 16 without use or maintenance of the AAPM field 162. Use of the AAPM field 162 is described to demarcate the window of opportunity within which programming may be performed. Accordingly, additional uses for the AAPM field 162 are envisioned. For example, a flag may be either logged with a time stamp and/or polled from a remote source, such as the SC 32 or one of the POS devices 28 and 30, for maintenance and/or troubleshooting purposes when one of the remote sources has been used to issue a request to enter the programming mode of operation. Furthermore, the AAPM field 162 may be used by the attendant or technician while at the FD 16 to verify that the FD 16 was placed into the programming mode of operation by a previously-issued request.

For ease of illustration, detailed representations of programming operations will not be described herein. FIG. 3 describes certain exemplary fields that may be programmed for the FD 16 during the programming mode of operation. Additional fields may be employed and multiple programming levels may be employed with higher levels of programming associated with more critical programming fields without departure from the scope of the subject matter described herein. As such, the process will determine whether the attendant or technician has indicated that programming is complete (decision point 532). This indication that programming is complete may be entered by the attendant or technician at the manager's keypad 20. The process will also determine whether the timer 166 has expired (decision point 534) and will determine whether a transaction has been started at the FD 16 (decision point 536).

The process may use a determination that the timer 166 has expired or that a transaction has been initiated to signal that the attendant or technician did not properly exit the programming mode of operation. Furthermore, if a transaction is initiated while the FD 16 is in the programming mode of operation, an appropriate error or alarm condition may be signaled to the attendant or technician and logging may be used to capture information associated with the transaction, such as price per unit, quantity dispensed and related information.

The process will iterate between determining whether programming is complete (decision point 532), whether the timer 166 has expired (decision point 534), and whether a transaction has been started (decision point 536) until one of the three conditions is true.

When the timer 166 has expired, the programming is complete, or a transaction is started, the process will exit the programming mode (step 538), clear the AAPM field 162 (step 524), return to retrieve the current AAPM protocol (step 502), and continue as described above. Because the current AAPM protocol field 164 is one field that may be programmed during the programming mode of operation, retrieving the current AAPM protocol will ensure that the most recently programmed AAPM protocol is used.

As described above, the wireless device 23 may be used by an attendant, technician, or other authorized personnel as an authorization terminal to generate the AAPM signal and any associated signaling included within an AAPM protocol from a location proximate to the FDs 16 to allow the authorized person to place any of the FDs 16 into the programming mode of operation without having to repeatedly travel between the central building 12 and the FDs 16 to generate the AAPM signaling from one of the POS devices 28 and 30 or the SC 32, or to repeatedly request that the remote system 42 generate the AAPM signaling.

Those skilled in the art will recognize improvements and modifications to the preferred embodiments of the present invention. All such improvements and modifications are considered within the scope of the concepts disclosed herein and the claims that follow.

What is claimed is:

1. A method for preventing fraud by a customer at a fuel dispenser within a retail fueling environment, comprising:
   receiving an authorization to access programming mode (AAPM) signal at the fuel dispenser from an authorization terminal separate from the fuel dispenser;
   receiving a request from a second terminal located at the fuel dispenser to enter a programming mode of operation (PMO); and
   entering the PMO at the fuel dispenser to allow fuel dispenser settings of the fuel dispenser to be changed after receiving the AAPM signal and the request to enter the PMO.

2. The method of claim 1 further comprising preventing the fuel dispenser from being placed into the PMO prior to it receiving the AAPM signal.

3. The method of claim 1 further comprising measuring, in response to receiving the AAPM signal, a first time period.

4. The method of claim 3 further comprising determining whether the first time period has expired.

5. The method of claim 4 further comprising preventing the fuel dispenser from being placed into the PMO if a fuel dispensing transaction is initiated by the customer at the fuel dispenser or if the first time period has expired before the request to enter the PMO is received.

6. The method of claim 4 wherein measuring the first time period further comprises starting a timer to determine when the first time period has expired.

7. The method of claim 6 wherein starting the timer further comprises reading a current timer value of the timer and determining whether the first time period has expired further comprises comparing an elapsed period of time relative to the current timer value.

8. The method of claim 6 wherein the timer is selected from a group consisting of an up-counting timer and a down-counting timer.

9. The method of claim 6 wherein determining whether the first time period has expired further comprises an action selected from the group consisting of polling the timer and receiving an interrupt from the timer.

10. The method of claim 1 further comprising measuring a time period representative of a time that the fuel dispenser is in the PMO.

11. The method of claim 10 wherein measuring the time period further comprises starting a timer upon entering the PMO.

12. The method of claim 10 further comprising exiting the PMO if a request to exit the PMO has not been received by an expiration of the time period.

13. The method of claim 1 further comprising receiving a request to exit the PMO.

14. The method of claim 13 further comprising exiting the PMO.

15. The method of claim 1 wherein the authorization terminal is selected from a group consisting of a point-of-sale (POS) device, a site controller, a remote system, and a wireless device.

16. The method of claim 1 wherein the request to enter the PMO is received via a manager's keypad located within a compartment of the fuel dispenser that is not accessible by the customer.

17. The method of claim 1 further comprising allowing programming parameters of the fuel dispenser to be changed while the fuel dispenser is in the PMO.

18. The method of claim 17 wherein the programming parameters include an operating mode, a drive-off warning, a transaction log enable setting, calibration values for the fuel dispenser, a zero price-per-unit (zero PPU) option, and PPU values.

19. The method of claim 1 further comprising selecting an AAPM protocol and wherein receiving the AAPM signal further comprises receiving additional signaling other than the AAPM signal in association with receiving the AAPM signal as part of the AAPM protocol.

20. The method of claim 19 further comprising receiving the additional signaling before the AAPM signal as part of the AAPM protocol to indicate that the AAPM signal is forthcoming.

21. The method of claim 20 wherein receiving the additional signaling before the AAPM signal includes receiving at least one pump stop signal before receiving the AAPM signal.

22. The method of claim 20 further comprising verifying proper receipt of the AAPM signal using the AAPM protocol.

23. The method of claim 19 further comprising receiving signaling after the AAPM signal as part of the AAPM protocol to indicate that the AAPM signal should have been received.

24. The method of claim 19 wherein the AAPM signal and the AAPM protocol are received from a point-of-sale (POS) device within the retail fueling environment.

\* \* \* \* \*